Patented Apr. 3, 1951

2,547,366

UNITED STATES PATENT OFFICE 2,547,366

THIURONIUM COMPOUNDS

Louis H. Bock, Huntingdon Valley, Pa., Norman H. Leake, Bristol, Tenn., and James L. Rainey, Abington, Pa., assignors to Rohm & Haas Company, Philadelphia, Pa., a corporation of Delaware No Drawing. Application February 23, 1949, Serial No. 77,994

4 Claims. (Cl. 260—564)

This invention concerns new thiuronium salts. It further relates to the process by which they are prepared.

More particularly, this invention deals with thiuronium salts having the formula

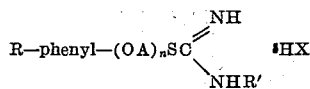

wherein R represents a hydrocarbon group of four to twelve carbon atoms, R' is hydrogen or a lower alkyl group such as methyl, ethyl, or butyl, A is an alkylene group of two to three carbon atoms, n is an integer from one to three, and HX represents an equivalent of an acid having the anion X.

These new thiuronium salts differ from previously known thiuronium compounds both in structure and in usefulness. Although some thiuronium salts have been described having as the S-substituent such group as an alkyl, carbalkoxyalkyl, or alkoxyalkyl group, these do not exhibit the marked bactericidal and fungicidal action which is possessed by the thiuronium salts of this invention.

The new salts are characterized by high bactericidal and bacteriostatic activity. They are especially effective against Gram-negative organisms. They are water-soluble and surface-active. They lack the intensely bitter taste which is common to some of the other types of bactericides which have recently become widely used. The compounds of this invention are useful as disinfectants for surgical instruments, dairy equipment, crockery, glassware, food storage bins, food wrappers, food machinery, and the like. They may be applied to textile fabrics and the like to prevent fungal attack. They are effective against fungi on living plants.

The new thiuronium salts are prepared by reacting a phenoxyalkyl halide with a thiourea. Temperatures from about 50° C. to 150° C. are generally used. The reaction is desirably carried out in the presence of an inert organic solvent. Solvents such as alcohols, esters, ethers, nitro-compounds, and hydrocarbons may be used. Acetonitrile and formamide are other solvents which have been found suitable. The products are usually solids which can be obtained as residues and which can be recrystallized for purification in many cases.

As a phenyl ether halide, there may be used compounds of the formula

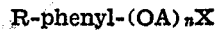

R is a hydrocarbon group of four to twelve carbon atoms. Particularly suitable are secondary and tertiary alkyl groups, such as secondary or tertiary butyl, amyl, hexyl, heptyl, octyl, decyl, and dodecyl groups. Other types of hydrocarbon groups may be used, such as alicyclic, represented by terpenyl and cyclohexyl; aralkyl, such as benzyl; aryl, such as cresyl or tert.-butylphenyl; unsaturated aliphatic groups such as undecenyl or the like. Other unreactive substituents may be present in the phenyl nucleus, such as alkyl, alkoxy, acyl, or halo. Typical of these are methyl, isopropyl, butyl, methoxy, ethoxy, acetyl, and like groups. A is an alkylene chain of two to three carbon atoms and is ethylene, 1,2-propylene, or trimethylene. X may be chlorine, bromine, or iodine.

Typical starting compounds are tert.-butylphenoxyethyl bromide, tert.-amylphenoxyethoxyethyl bromide, methyl-tert.-butylphenoxyethoxyethoxyethyl bromide, (2-octyl)phenoxyethyl chloride, diisobutylphenoxyethoxyethyl chloride, tert.-dodecylphenoxyethyl bromide, terpenylphenoxyethoxyethoxyethyl chloride, undecenylphenoxyethoxyethyl bromide, p,1,3,5,7-tetramethyloctylphenoxyethoxyethyl bromide, etc.

Thiourea itself or a monoalkyl derivative thereof may be used. The alkyl group is an N-substituent and is desirably of not over four carbon atoms. Presumably the imino-group and the amino-group are tautomeric.

The following examples are illustrative of procedures which are appropriate for the preparation of the new thiuronium salts of this invention.

EXAMPLE 1

There were mixed 98 parts by weight of p-1,1,3,3-tetramethylbutylphenoxyethyl bromide, 19 parts of thiourea, and 125 parts of ethyl alcohol. The mixture was stirred and heated under reflux for six hours. The ethyl alcohol was then removed by distillation under reduced pressure. The residue was taken up in heptane and the product crystallized therefrom in a yield of 86 parts by weight. The product was a white crystalline solid which corresponded in composition to

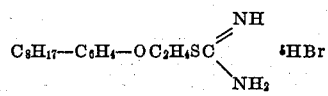

The tetramethylbutylphenoxyethyl bromide was prepared by mixing 236 parts by weight of ethylene dibromide, 206 parts of p-1,1,3,3-tetramethylbutylphenol, 136 parts of water, and 100 parts of ethyl alcohol. The mixture was stirred and heated under reflux. Thereto over a period of an hour there was added a solution of 44 parts of sodium hydroxide in 60 parts of water. Thereafter heating and stirring were continued for ten hours. An oil layer formed and was separated. It was distilled at 158° C.–164° C./0.2 mm.

The phenol coefficient of the above thiuronium salt was determined by the F. D. A. method at 20° C. with *Eberthella typhi* and *Staphylococcus aureus* and found to be 500 and 330 against the respective organisms.

Tests were made to determine the highest dilutions at which this compound gave bacteriostatic (Bs) and bactericidal (Bc) actions. Dilutions were made in a trypticase-soy broth. The results are summarized in the following table in which organisms used are related to the dilutions.

*Table I*

EFFECTIVE DILUTIONS OF S-DIISOBUTYLPHENOXY-ETHYLTHIURONIUM BROMIDE

| Organism | Dilutions | |
|---|---|---|
| | Bs | Bc |
| Staphylococcus aureus | 256,000 | 4,000 |
| Streptococcus pyogenes | 256,000 | 128,000 |
| Streptococcus fecalis | 256,000 | 84,000 |
| Neisseria catarrhalis | 512,000 | 512,000 |
| Eberthella typhi | 32,000 | 32,000 |
| Pseudomenas aerugenosa | 2,000 | 1,000 |
| Proteus vulgaris | 2,000 | 1,000 |
| Brucella suis | 64,000 | 64,000 |
| Clostridium welchii | 128,000 | 128,000 |

The highest dilution was determined at which this thiuronium salt was bactericidal in hard water against *Escherichia coli*. The water had a natural hardness of 315 P. P. M. The time of exposure was one to three minutes. A complete kill was obtained even at a dilution of 1 to 3,000.

A similar test was made with sterile whole milk at 1% in distilled water. Here the tests showed complete kill at 1 to 1,000 in 30 seconds, at 1 to 2,000 in one minute, and at 1 to 3,000 in two minutes.

The ten minute killing dilution against *E. typhi* at 37° C. in a phenol coefficient type of test was 1 to 60,000.

EXAMPLE 2

There were mixed 202 parts of 1,1,3,3-tetramethylbutylphenoxyethyl chloride, 58 parts of thiourea, and 400 parts of ethanol. The mixture was heated under reflux for 17.5 hours. Part of the ethanol was distilled off and the reaction mixture was cooled. Thereupon 2,000 parts of ethyl ether was added. Crystals formed, were separated, and dried at room temperature. The product thus obtained amounted to 165 parts by weight (65% yield) and corresponded in composition to

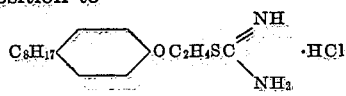

The product had a chlorine content of 10.3%; theory for the above compound is 10.3%.

The tetramethylbutylphenoxyethyl chloride was prepared by mixing and heating together at 90° C.–100° C. on a steam bath for three and a half hours 469 parts of beta-chloroethyl p-toluene sulfonate, 423 parts of p-tetramethylphenol, 83 parts of sodium hydroxide, and 200 parts of water. The reaction mixture was cooled. A crystalline solid was separated. The mixture was made alkaline with sodium hydroxide and extracted with benzene. The benzene layer was separated, dried, and distilled. The product was obtained by distillation at 174°–182° C./8 mm. The yield was 465 parts.

The phenol coefficient of the tetramethylbutylphenoxyethyl thiuronium chloride was 238 against *E. typhi* and 83 against *Staph. aureus*.

Tests made to determine the highest dilutions at which this compound gave bacteriostatic (Bs) and bactericidal (Bc) actions are summarized in Table II.

*Table II*

EFFECTIVE DILUTIONS OF S-TETRAMETHYLBUTYL-PHENOXYETHYL THIURONIUM CHLORIDE

| Organism | Dilutions | |
|---|---|---|
| | Bs | Bc |
| Staph. aureus | 64,000 | 16,000 |
| S. pyogenes | 512,000 | 256,000 |
| S. fecalis | 64,000 | 16,000 |
| N. catarrhalis | 128,000 | 64,000 |
| E. typhi | 4,000 | 4,000 |
| Brucella suis | 8,000 | 8,000 |
| Cl. welchii | 64,000 | 32,000 |

EXAMPLE 3

There were mixed 201 parts of p-1,1,3,3-tetramethylbutylphenoxyethoxyethyl chloride, 90 parts of thiourea, 300 parts of toluene. The mixture was stirred and heated under reflux (110° C.–115° C.) for 24 hours. The solvent was stripped off by heating on a steam bath under reduced pressure. The residue was taken up in hot ethanol, ethyl ether was added after the solution had been cooled, and crystals were formed. These were separated and air-dried. The material corresponded in composition to

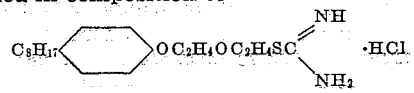

The phenol coefficients were 388 against *E. typhi* and 143 against *Staph. aureus*.

Tests made to determine highest dilutions for bacteriostatic and bactericidal actions are presented in Table III.

*Table III*

EFFECTIVE DILUTIONS OF S-DIISOBUTYLPHENOXY-ETHOXYETHYL THIURONIUM CHLORIDE

| Organism | Dilution | |
|---|---|---|
| | Bs | Bc |
| Staph. aureus | 128,000 | 64,000 |
| S. pyogenes | 1,024,000 | 512,000 |
| S. fecalis | 128,000 | 64,000 |
| N. catarrhalis | 256,000 | 256,000 |
| E. typhi | 4,000 | 4,000 |
| Brucella suis | 64,000 | 32,000 |
| Cl. welchii | 256,000 | 64,000 |

EXAMPLE 4

There were taken 25 parts of the thiuronium chloride prepared in Example 3. This was dissolved in hot ethyl alcohol and thereto was added 16 parts of sodium acetate in 150 parts of ethyl alcohol. Sodium chloride was precipitated and filtered off. The alcohol was evaporated under reduced pressure and the residue was crystallized on cooling. The crystals were filtered off and dried. They corresponded in composition to

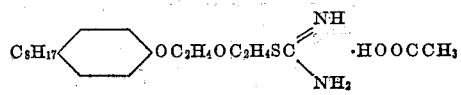

The phenol coefficients were determined as 55 against *E. typhi* and 83 against *Staph. aureus*. The product had a very mild taste.

EXAMPLE 5

There were mixed 810 parts of p-1,1,3,3-tetramethylbutylphenoxyethoxyethyl chloride, 233 parts of methylthiourea, and 500 parts of ethanol. The mixture was stirred and heated under reflux for 48 hours. Ethanol was stripped off under reduced pressure. The residue was a heavy oil, which was used without further purification. Nevertheless, the analyses of the residue agreed fairly well with theoretical values. The nitrogen content, for example, was 6.76% against 6.96% for theory for

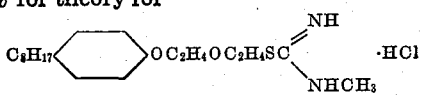

Phenol coefficients were determined as 77 against *E. typhi* and 420 against *Staph. aureus*.

EXAMPLE 6

There were mixed 541 parts of p-tert.-amylphenoxyethoxyethyl chloride, 152 parts of thiourea, and 500 parts of toluene. The mixture was stirred and heated under reflux for 23 hours. The toluene was distilled off under reduced pressure. The product was crystallized from ethanol and ethyl ether. It corresponded in composition to

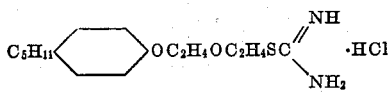

A phenol coefficient of 71 against *E. typhi* was found. The product had a very mild taste.

The above preparation was repeated with an equivalent weight of tert.-butylphenoxyethoxyethyl chloride. The product obtained was identified as

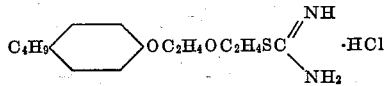

This compound had a phenol coefficient of 74 against *E. typhi* and was a relatively innocuous compound as to odor and irritation.

The repetition of the above preparations with tert.-amylphenoxyethoxyethyl bromide and tert.-butylphenoxyethoxyethyl bromide leads to the corresponding thiuronium bromides. These are even more favorable as to odor and irritation than the above chlorides.

Repetition of the above preparation with isododecylphenoxyethoxyethyl bromide leads to the compound

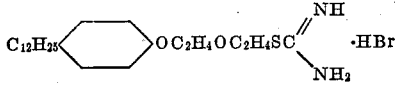

A particularly useful form of the $C_{12}$ group is the tetraisopropyl group and the salt obtained as the end-product is of the same empirical formulas as that last-given.

Likewise, di(tert.-butyl)phenoxyethoxyethyl chloride was reacted with thiourea. The product had the structure

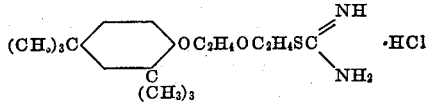

It gave phenol coefficients of 138 against *E. typhi* and 125 against *Staph. aureus*.

Another variation which has been examined and found satisfactory is the use of the capryl group as a secondary octyl substituent. In this case the final compound obtained had the structure

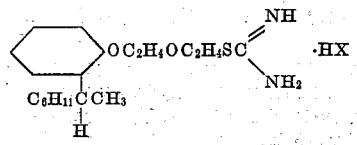

It too was highly effective as a bactericidal and fungicidal agent.

EXAMPLE 7

There were mixed 401 parts by weight of p-diisobutylphenoxyethoxyethoxyethyl bromide and 76 parts of thiourea in 400 parts of xylene. The mixture was heated gently at first and then under full reflux for eight hours. The product was obtained as a residue by removing the solvent under reduced pressure. The product corresponded in composition to

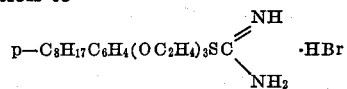

It has a phenol coefficient of about 400 against the common test organisms and is very mild and innocuous in the dilute solutions which are effective because of the bactericidal and fungicidal efficiency of this substance.

In testing the compounds of this invention bactericidal efficiency was measured in a number of ways and against various organisms. Phenol coefficients were determined by the F. D. A. method at 20° C. and represent the ratio of effective dilution of the compound under test to the effective dilution of phenol.

Tests were also run against pathogenic organisms by a dilution method utilizing trypticase-soy broth. One per cent solutions of the product under test were diluted with broth and several dilutions autoclaved for ten minutes at 10 to 12 lbs. pressure. The dilutions were cooled and inoculated with a 4 mm. loopful of a test organism culture. Incubation was carried out at 37° C. for 24 hours. The highest dilution showing no growth gave the end-point for bacteriostatic action. After an additional 24 hours of incubation at 37° C. subcultures were made by transferring three loopfuls from cultures showing no growth to fresh trypticase-soy broth. The subcultures were incubated 48 hours. The highest dilution showing no growth was taken as the endpoint of bactericidal action.

The compounds of this invention have also been tested by the slide germination method against *Macrosporium sarcinaeforme* and *Sclerotinia fructicola* and found to be inhibitive to germination at dilution ratios from 1 to 10,000 to 1 to 200,000.

Typical compounds have been applied to living plants and found to be effective in controlling fungi thereupon at low concentrations without producing phytocidal effects.

We claim:

1. As new substances, compounds of the formula

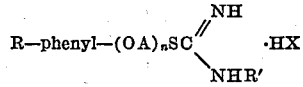

wherein R represents an alkyl group of four to twelve carbon atoms, R' is a member of the class consisting of hydrogen and the alkyl groups of not over four carbon atoms, A is an alkylene group of two to three carbon atoms, $n$ is an integer from one to three, and HX is an equivalent of an acid having an anion X.

2. As a new chemical substance, p-1,1,3,3-tetramethylbutylphenoxyethoxyethyl thiuronium halide.

3. As a new chemical substance, p-1,1,3,3-tetramethylbutylphenoxyethyl thiuronium bromide.

4. As a new chemical substance, p-1,1,3,3-tetramethylbutylphenoxyethyl thiuronium chloride.

LOUIS H. BOCK.
NORMAN H. LEAKE.
JAMES L. RAINEY.

REFERENCES CITED

The following references are of record in the file of this patent:

UNITED STATES PATENTS

| Number | Name | Date |
|---|---|---|
| 2,270,893 | Orthner et al. | Jan. 27, 1942 |
| 2,344,321 | Orthner et al. | Mar. 14, 1944 |